United States Patent [19]
Kitamura

[11] Patent Number: 4,991,706
[45] Date of Patent: * Feb. 12, 1991

[54] MACHINE TOOL

[75] Inventor: Koichiro Kitamura, Takaoka, Japan

[73] Assignee: Kitamura Machinery Co., Ltd., Toyama, Japan

[ * ] Notice: The portion of the term of this patent subsequent to Jan. 2, 2007 has been disclaimed.

[21] Appl. No.: 398,911

[22] Filed: Aug. 28, 1989

Related U.S. Application Data

[62] Division of Ser. No. 918,888, Oct. 15, 1986, Pat. No. 4,890,716.

[30] Foreign Application Priority Data

Oct. 15, 1985 [JP] Japan .................................. 60-227839
Oct. 15, 1985 [JP] Japan .................................. 60-227840
Oct. 15, 1985 [JP] Japan .................................. 60-227841
Oct. 15, 1985 [JP] Japan .................................. 60-227842

[51] Int. Cl.$^5$ .............................................. B65G 37/00
[52] U.S. Cl. .................................. 198/346.1; 29/33 P
[58] Field of Search ............... 198/346.1, 346.2, 465.1, 198/803.01, 465.2, 345, 803.15; 414/225, 226; 29/33 P, 563; 901/36, 37, 39

[56] References Cited

U.S. PATENT DOCUMENTS

| 1,242,825 | 10/1917 | Linfoot ............................ 198/803.15 |
| 4,299,532 | 11/1981 | Bouwmeester ................... 198/346.2 |
| 4,306,646 | 12/1981 | Magni ............................ 198/346.1 X |
| 4,423,806 | 1/1984  | Ogasawara ..................... 198/465.1 X |
| 4,444,303 | 4/1984  | Burgess, Jr. ........................... 198/345 |
| 4,483,436 | 11/1984 | Krishnakumar et al. ..... 198/803.7 X |
| 4,530,433 | 7/1985  | Cucchetto ..................... 198/803.7 X |
| 4,687,093 | 8/1987  | Marshall et al. ................. 198/771 X |

FOREIGN PATENT DOCUMENTS 0088644 10/1983 European Pat. Off. .
0132528 5/1984 European Pat. Off. .
2159552 12/1971 Fed. Rep. of Germany .
3313140 4/1983 Fed. Rep. of Germany .
2306787 4/1976 France .
1202881 1/1986 U.S.S.R. ............................... 901/36

OTHER PUBLICATIONS

Patent Abstracts of Japan, vol. 8, No. 164 (M-313)[1601], Jul. 28, 1984; & JP-A-59 59 334.
Patent Abstracts of Japan, vol. 8, No. 164 (M-313)[1601], Jul. 28, 1984; & JP-A-59 59 342.
Patent Abstracts of Japan, vol. 4, No. 20 (M-92), Feb. 19, 1980, p. 141 M 92; & JP-A-54 158 774.
Machine Moderne, vol. 63, No. 719, Feb. 1969, pp. 27–32, Paris, FR; M. Fauvel: "Dispositifs Autotiques d'Alimentation sur Machines a Tailer les Engrenages par Fraises méres . . . Taillage".

Primary Examiner—H. Grant Skaggs
Assistant Examiner—Cheryl L. Gastineau
Attorney, Agent, or Firm—Wegner, Cantor, Mueller & Player

[57] ABSTRACT

A machine tool has a machine tool body, a spindle attached to the machine tool body for holding a tool, a bed provided on the machine tool body, and a table located on the bed for supporting a workpiece at a desired position and orientation so that the workpiece can be machined by the tool. The machine tool further includes a workpiece station for storing workpieces and a workpiece changer for moving the workpieces between the workpiece station and the table. The workpiece station is an endless conveyor having a series of setting openings located at regular intervals. Each workpiece is supported by a workpiece holder, and each of the workpiece holders are detachably set in one of the setting openings. A spring within each setting opening holds the workpiece holders.

9 Claims, 18 Drawing Sheets

Fig.4
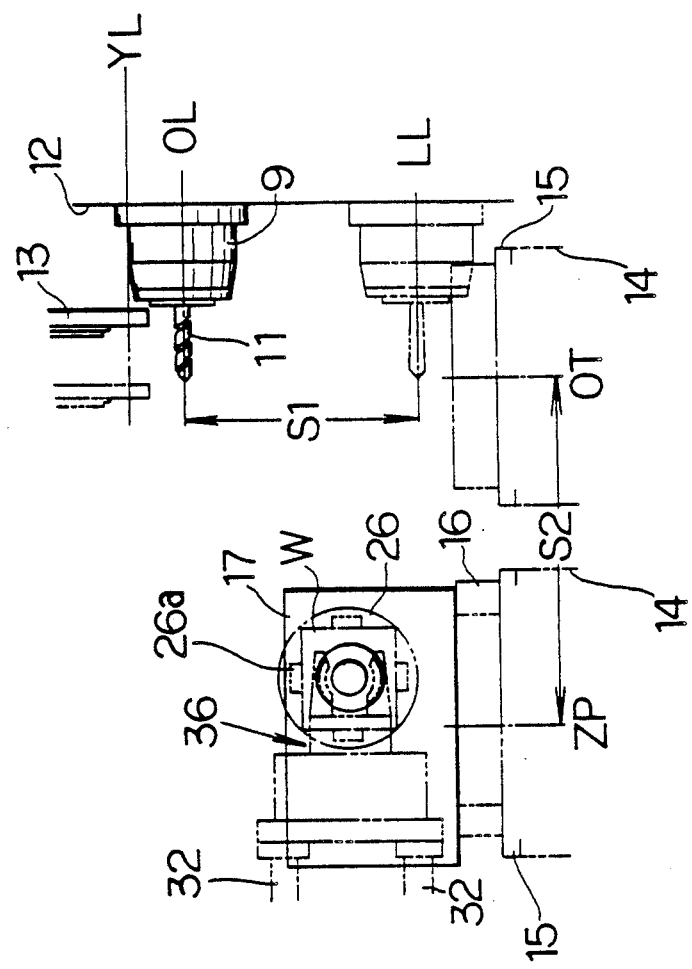
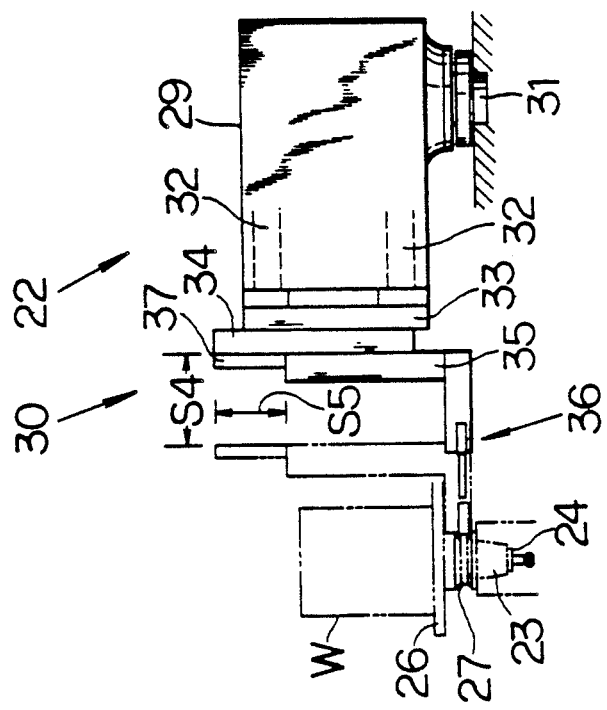

MACHINE TOOL

This application is a division of U.S. application Ser. No. 918,888, filed Oct. 15, 1986, now U.S. Pat. No. 4,890,716.

BACKGROUND OF THE INVENTION

This invention relates to a machine tool equipped with a workpiece station.

In an improved flexible machining system, a machine tool body is normally equipped with a workpiece station in which a plurality of pallets each fixedly holds a workpiece in such a manner that the workpieces can be conveyed by the pallets in series to a predetermined place and then transferred by a workpiece changer to the machine tool body. After it is machined, it is returned to its original position by means of the workpiece changer.

The conventional pallets are large and heavy so that they cannot be easily handled by an operator in particular when they are moving. Also, it is not easy to change an improper or wrong workpiece to a proper or correct workpiece in a specific pallet when it is moving. For such a reason, the pallets must stop for the workpiece exchange purpose. It decreases effectiveness.

OBJECT OF THE INVENTION

The object of this invention is to provide a machine tool equipped with a workpiece station in which exchange of works can be easily made even if a conveyer in the workpiece station is in operation.

BRIEF DESCRIPTION OF THE DRAWINGS

FIG. 4 is a schematic front view showing a relationship among a spindle, a first rotary table and a workpiece feeding means;

BRIEF DESCRIPTION OF THE PREFERRED EMBODIMENTS

Figure 1:
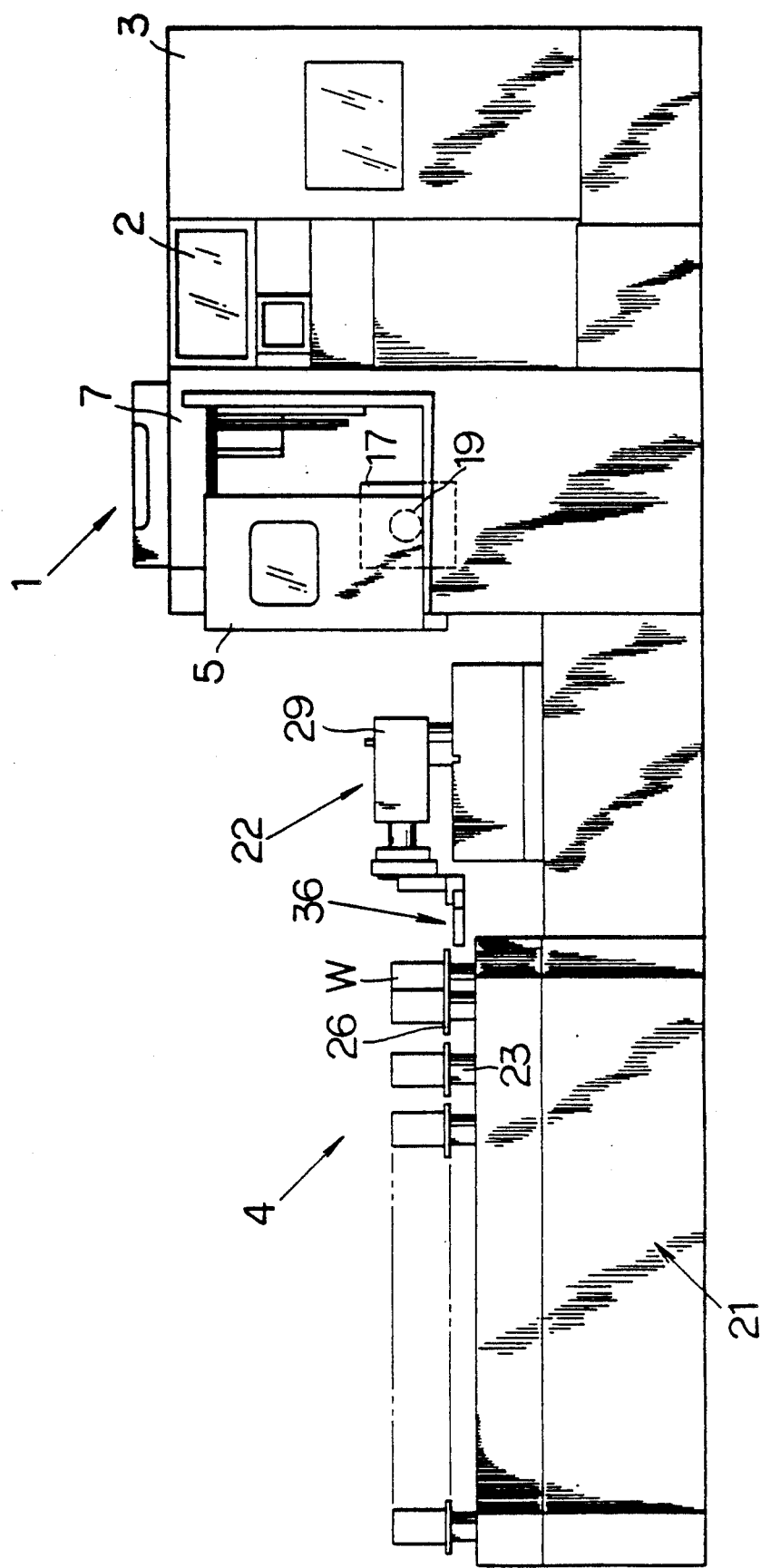
FIG. 1 is a front view showing a machine tool with index means according to a preferred embodiment of this invention.
Figure 2:
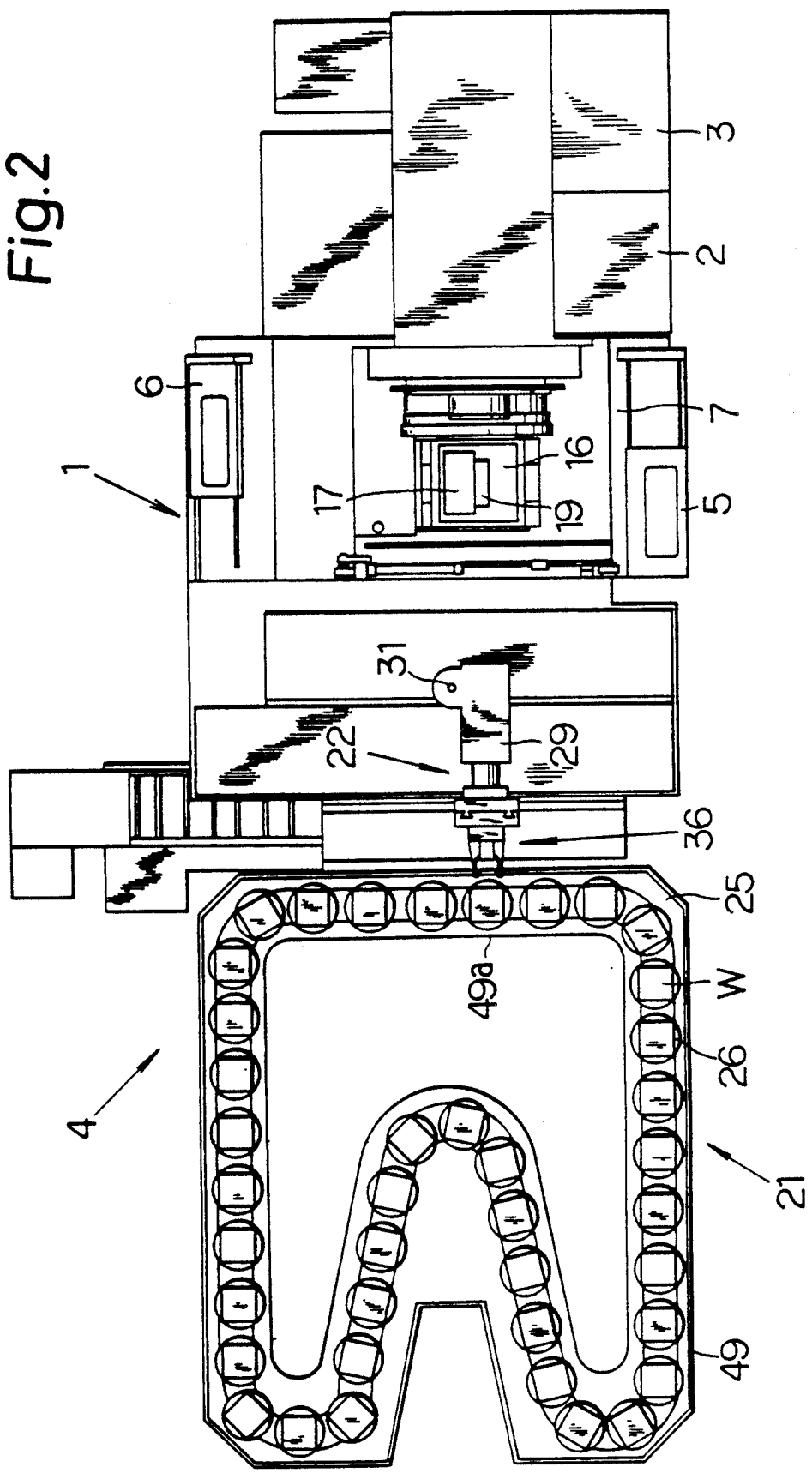
FIG. 2 is a plane view of the machine tool with index means shown in FIG. 1.
Figure 3:
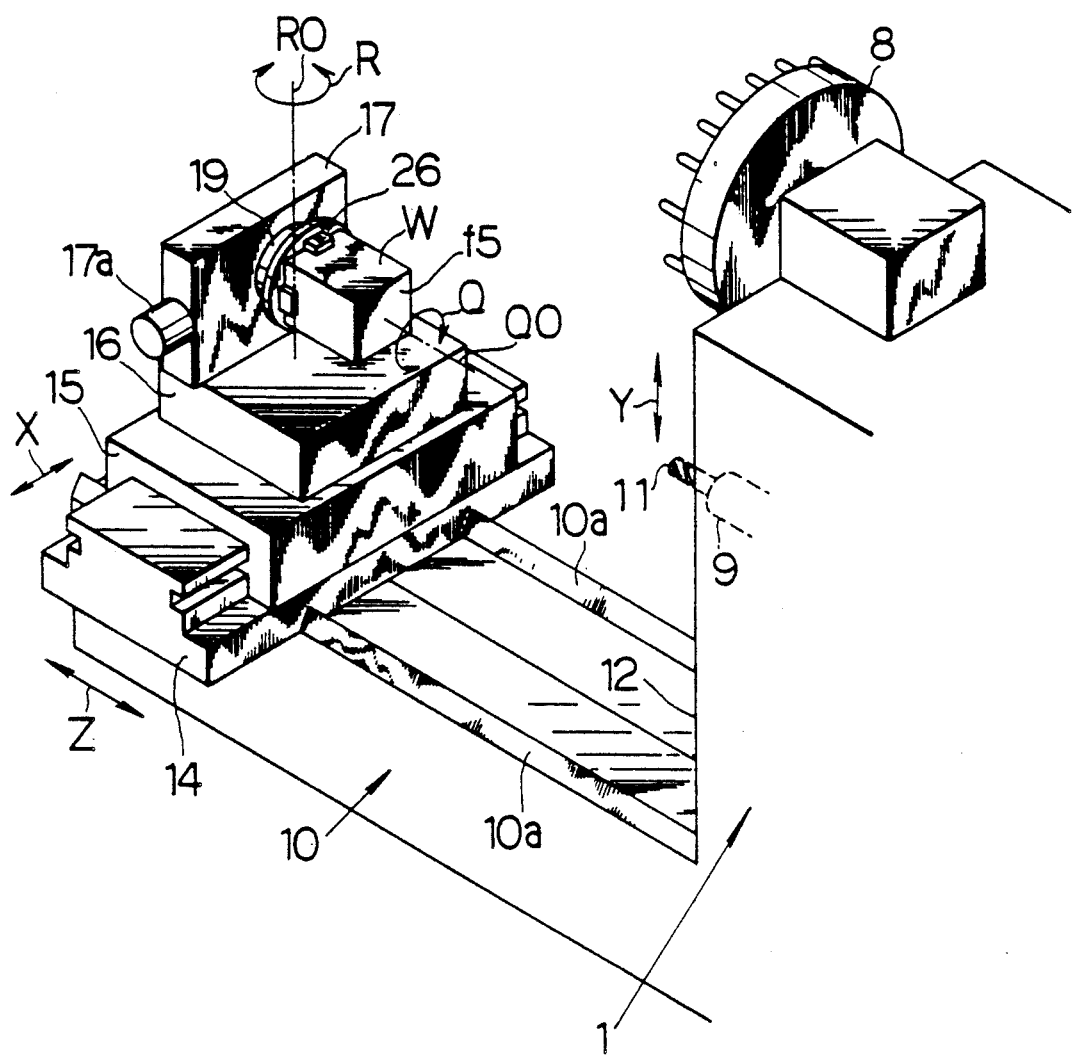
FIG. 3 is a perspective view showing an essential portion of the machine tool with index means shown in FIG. 1.

Referring to FIG. 1 through FIG. 3, a machine tool body 1 is equipped with a spindle 9 which can move vertically in the direction of an arrow Y in FIG. 3. A first table 14 is provided on a bed 10 of the machine tool body 1 and movable horizontally in the direction of an arrow Z in FIG. 3. The first table 14 can move toward a tool 11 attached to the spindle 9. A second table 15 is set on the first table 14 and can move in a horizontal direction at a right angle to the moving direction of the first table 14. A first rotary table 16 set on the second table 15 can be indexed about the rotation axis RO. The first rotary table 16 has an extension portion 17 extending upwardly. A second rotary table 19 is set at a side surface 16 of the extension portion 17 and can be indexed about a rotation axis QO in a direction Q. The second rotary table 19 is to hold fixedly a workpiece W.

A workpiece feeding means 4 is used to load the workpiece W onto the second rotary table 19 and, after machining thereof, unload each workpiece W from the second rotary table 19.

Figure 14:
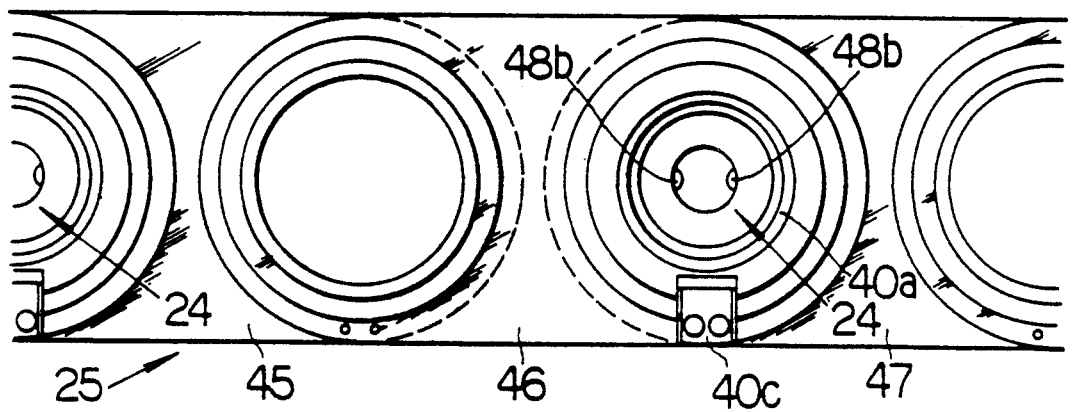
FIG. 14 is a plane view showing a portion of a conveyer in a workpiece station of the machine tool shown in FIG. 1.
Figure 15:
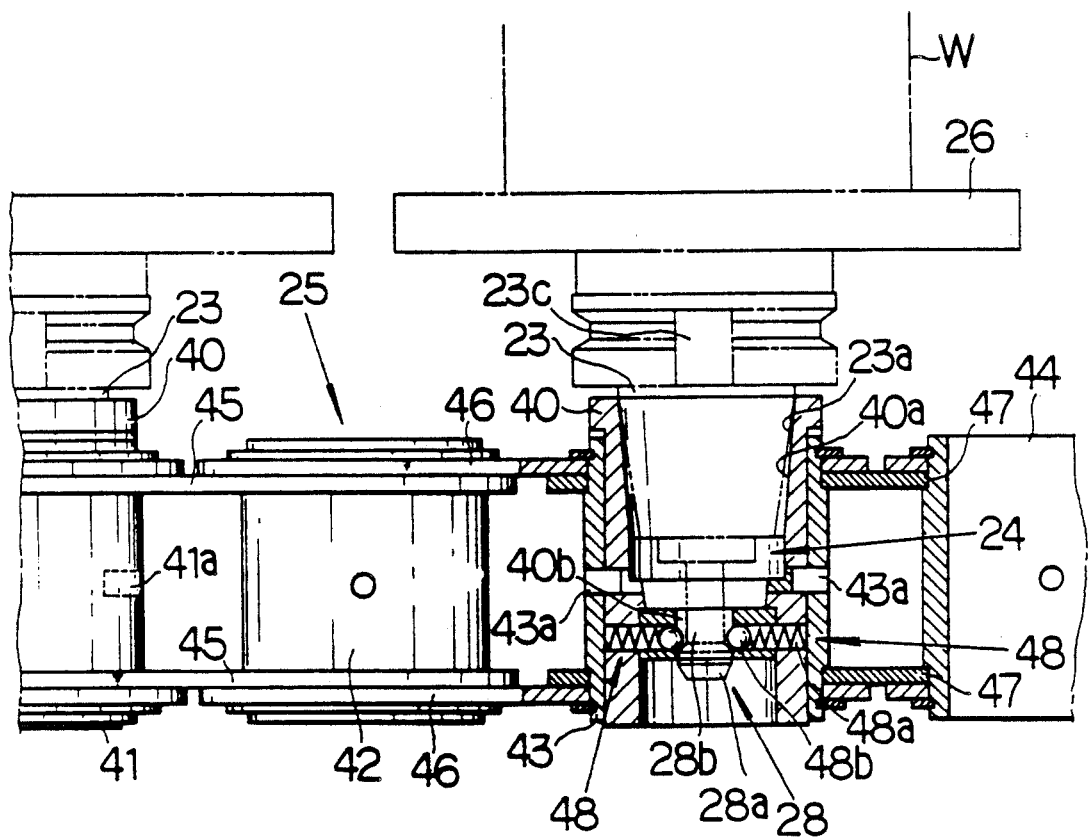
FIG. 15 is a plane view showing, partly in section, a portion of the conveyer shown in FIG. 14.

Referring to FIGS. 2, 14 and 15, a plurality of workpiece holders 23 each holding a workpiece W is desinged to be set into a series of openings 24 in an endless type transfer means such as a conveyer 25. Each workpiece holder 23 is detachably held in the setting opening 24 due to the biasing force of spring means 48. When the conveyer 25 moves in the workpiece station 21, the workpieces W and the workpiece holders 23 are conveyed to their predetermined point. Exchange of the workpieces W can be easily made by changing one workpiece holder 23 to another workpiece holder 23.

Figure 19:
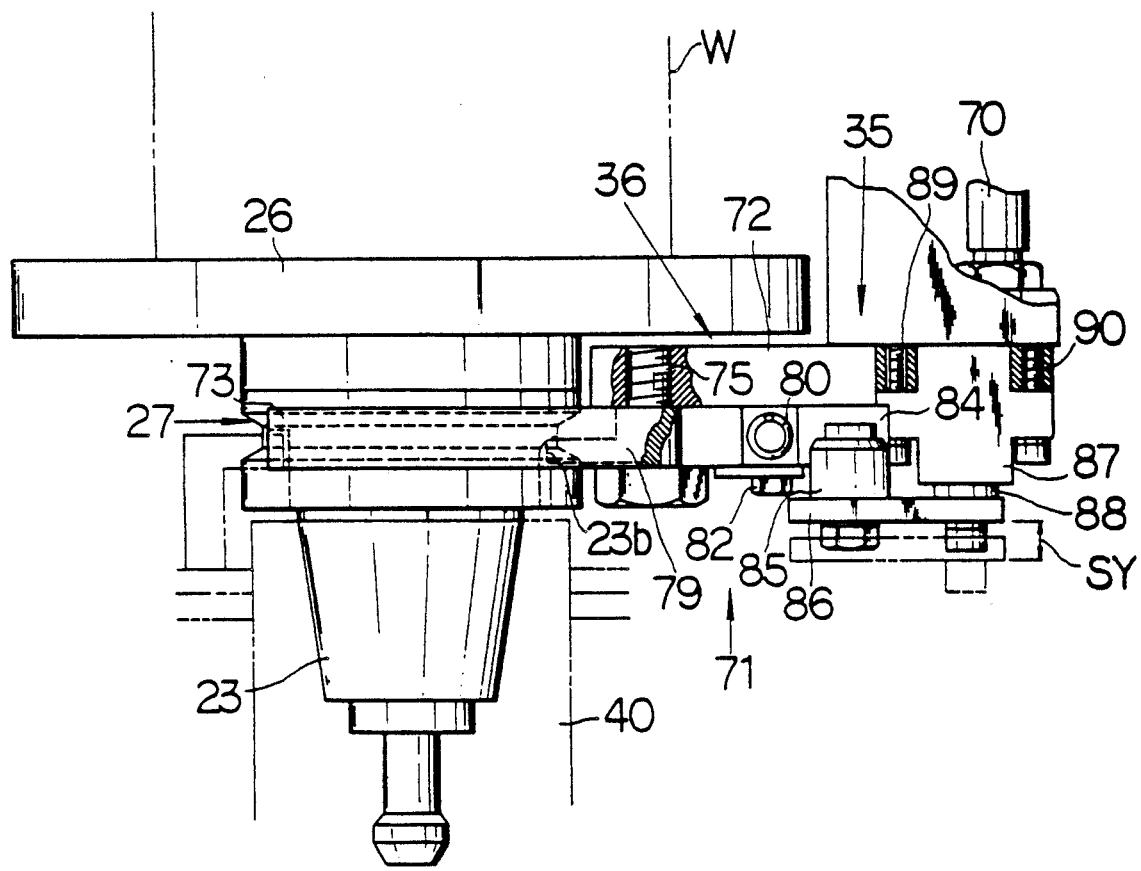
FIG. 19 is a schematic front view showing, partly in section, a finger and an arm which hold a workpiece holder.
Figure 20:
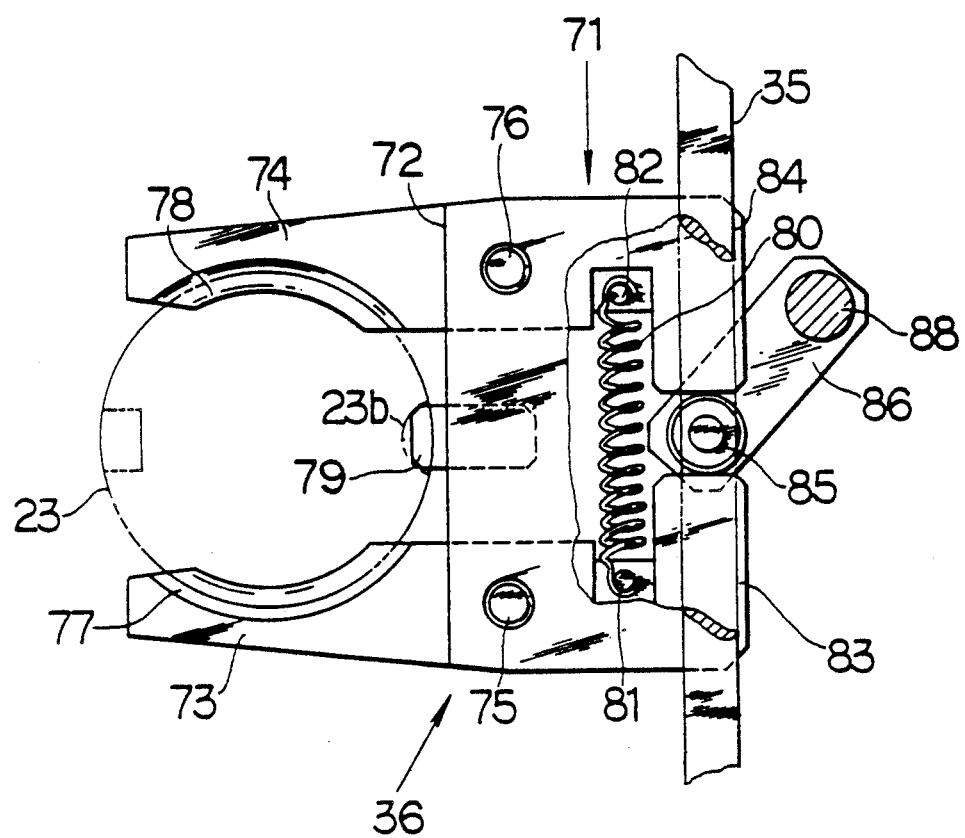
FIG. 20 is a plane view showing, partly in section, an arm and a pair of fingers which hold a workpiece holder.
Figure 22:
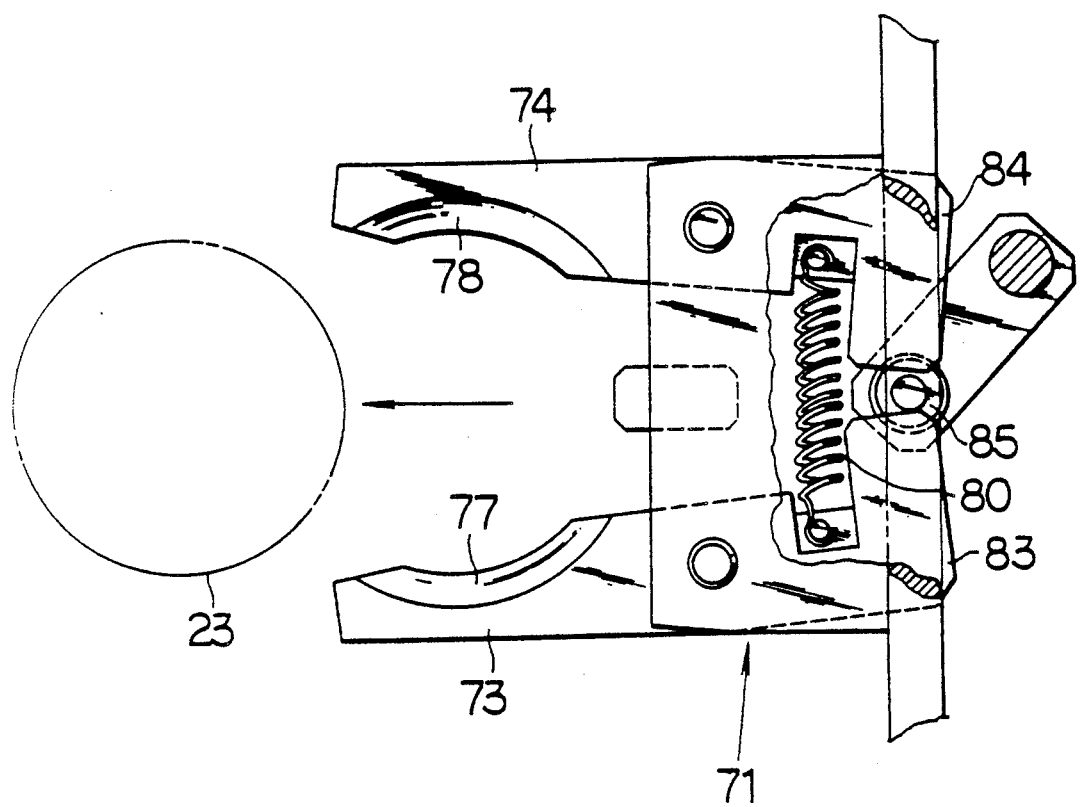
FIG. 22 is a plane view showing, partly in section, the arm and the fingers which do not hold the workpiece holder.

Referring to FIGS. 19 to 20, a workpiece holder supporting means is used to allow quick transfer of the workpieces W. A first and second fingers 73, 74 are rotatably attached to a horizontal plate 72 of the arm 36. The fingers 73, 74 have claws 77, 78, respectively, for holding one workpiece holder 23. A spring 80 is provided between the first and second fingers 73, 74. The arm support 35 is equipped with an operation means such as an air cylinder means 87. A lock pin 85 can be vertically moved by the air cylinder means 87 so as to be and inserted between the first and second fingers 73, 74 against the tension force of the spring 80. In a normal condition, the claws 77, 78 are open due to the force of the spring 80 as shown in FIG. 22. If the workpiece holder 23 is inserted between the claws 77, 78, the rod 88 of the air cylinder means 87 contracts whereby the lock pin 85 is inserted between the first and second fingers 73, 74. As a result, the workpiece holder 23 is caught by the claws 73, 74 as shown in FIG. 20.

Figure 16:
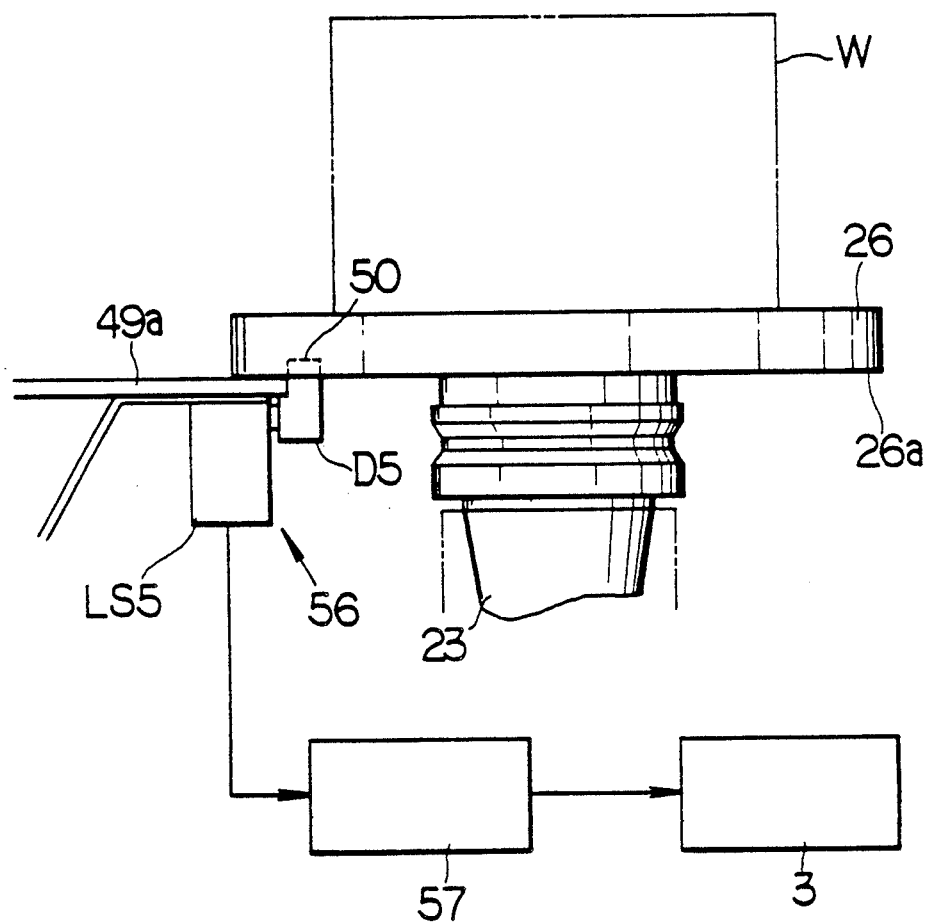
FIG. 16 is a plane view showing a detection portion and detected elements of the conveyer shown in FIG. 14.
Figure 17:
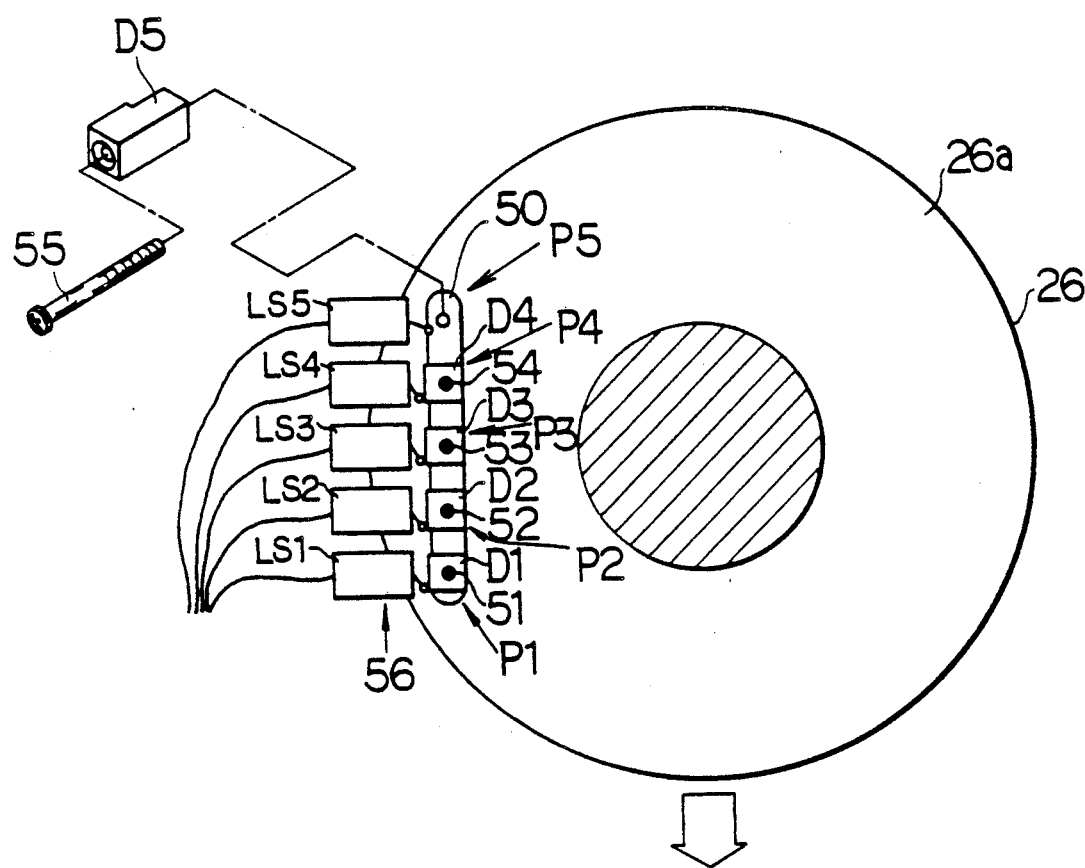
FIG. 17 is an explanatory view showing detected elements and a disk.
Figure 18:
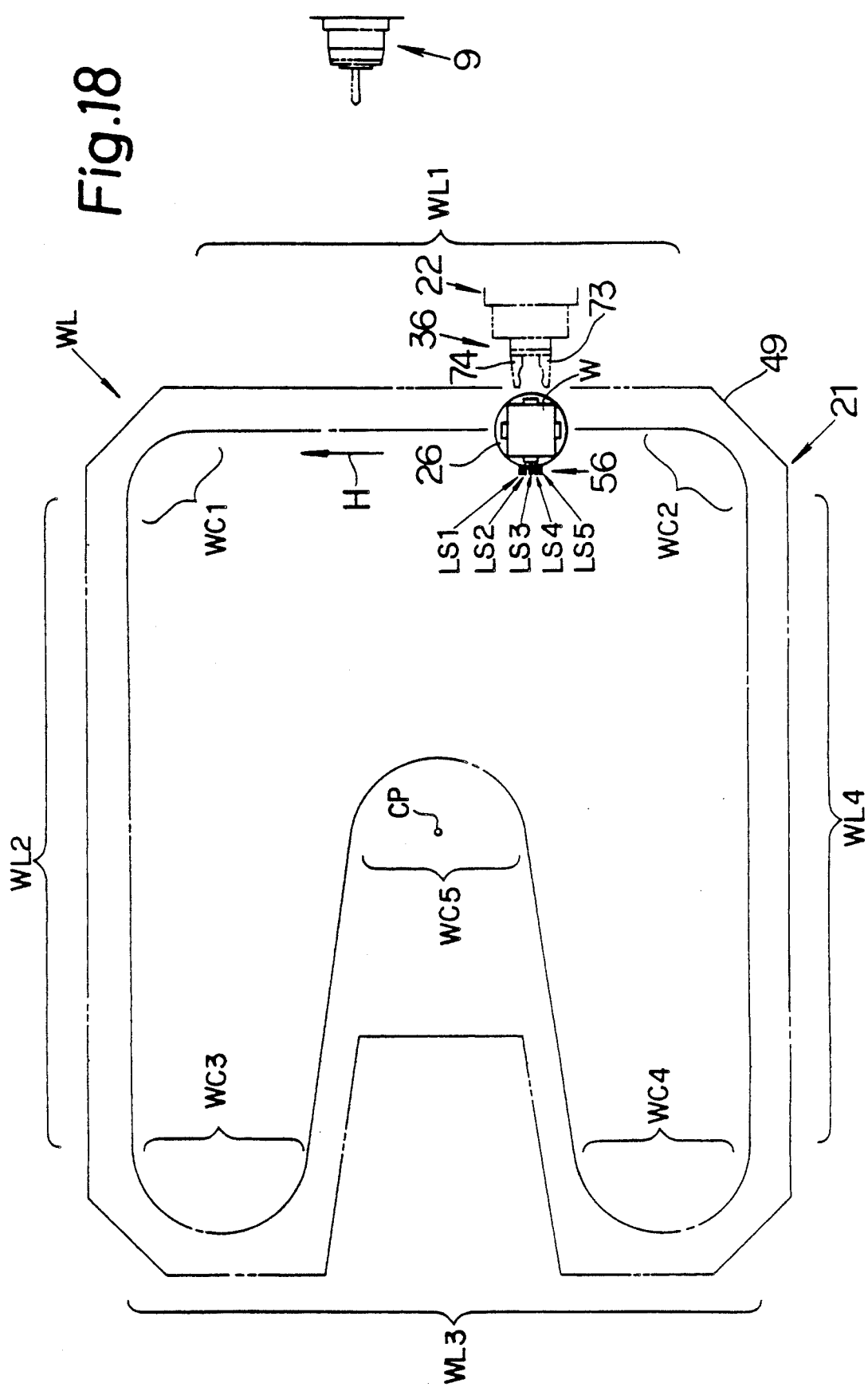
FIG. 18 is an explanatory view showing the conveyer and its related members.

Referring to FIGS. 16 to 18, a predetermined number of workpiece holders 23 are detachably set on the conveyer 25. The workpiece holders 23 are equipped with a plurality of detected elements or dogs D1 to D5, respectively. These detected elements D1 to D5 are detachably arranged in order at the positions P1 to P5 for the purpose of identifying various types of workpieces W. A detection portion 50 including plural limit switches LS1 to LS5 is attached to an inner portion 49a of the setting member 49 in the workpiece station 21 near the workpiece holder 23. Presence or absence of the detected elements D1 to D5 are detected by the corresponding limit switches LS1 to LS5 thereby to produce detection signals corresponding to a type of the detected workpiece W before the workpiece is transferred to the machine tool body 1. The detection signals are sent to a decision unit 57. This decision unit 57 decides a type of the detected workpiece W and sends decision signals to the NC machine 3. Thus, a desired machining program for the decided type of the workpiece W is called in the NC machine 3. The workpiece can be machined according to the program in a conventional manner.

The conveyer 25 is provided on the setting member 49. The transfer path WL of the conveyer 25 has a U-shaped or V-shaped concave portion WC5 which extends slightly over the center CP of the workpiece station 21. Therefore, the length of the transfer path WL can be enlarged within a limited space on the workpiece station 21. Also, an operator can handle effectively the workpiece holders together with the workpieces in the concave portion WC5. The transfer path WL is formed along the periphery of the setting member 25.

DETAILED DESCRIPTION OF THE PREFERRED EMBODIMENTS

Referring now to FIGS. 1 and 2, a machine tool according to this invention is preferably of a horizontal machining center type. A machine tool body 1 is equipped with an operation panel 2, a NC machine 3 and a workpiece feeding means 4. A chip guard 7 covers the machine tool body 1 and has a door 5.

As shown in FIGS. 3 and 4, the machine tool body 1 is also equipped with an automatic tool changer 13, a tool magazine 8, a spindle 9 and a bed 10.

A tool 11 attached to the spindle 9 can be replaced by any one of other tools set on the tool magazine 8 by means of the automatic tool changer 13. One example of the tool 11 is a drill.

As shown in FIGS. 3 and 4, the spindle 9 holding the tool 11 can move vertically along the stroke S1 from a lower level LL to an upper level OL by means of a motor (not shown) equipped in the spindle 9 and a feeding mechanism (not shown) in the direction Y. The upper level OL corresponds to the initial machine level. When the tool 11 is to be exchanged to another one, the spindle 9 moves up to a tool exchange level YL.

A first table 14 is slidably set on a pair of rails 10a of the bed 10 in such a manner that the first table 14 can move horizontally in the direction Z by means of an actuating means (not shown) equipped therein and a feeding mechanism (not shown). The first table 14 can move toward the tool 11 attached to the spindle 9. The first table 14 is also movable along the stroke S2 between the initial machine position ZP and the end position OT.

Figure 5:
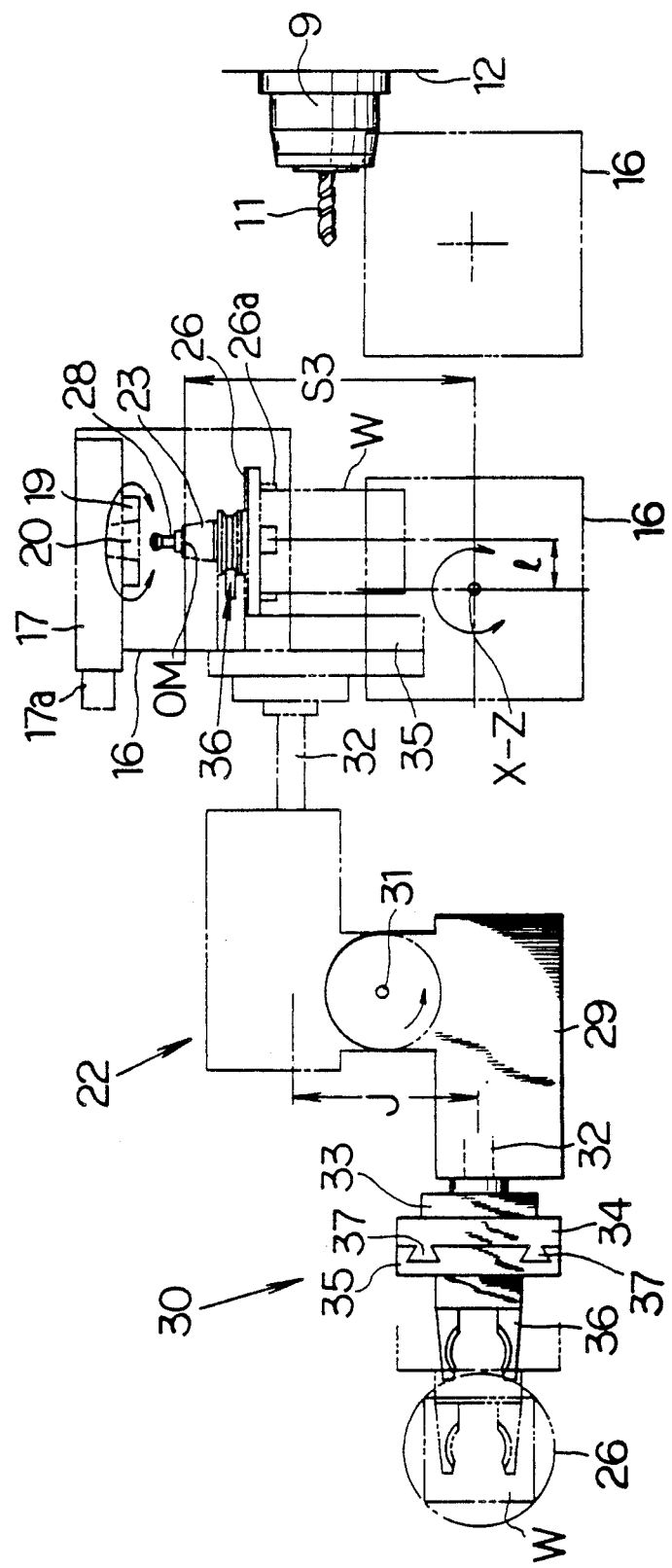
FIG. 5 is a plane view showing a relationship among a spindle, a first rotary table and a workpiece feeding means.

A second table 15 is slidably set on the first table 14 in such a way that the second table 15 can move in the direction X which is at a right angle to the axis Z and in parallel to a horizontal plane, by means of a motor (not shown) equipped therein and a feeding mechanism (not shown). As shown in FIG. 5, the second table 15 is movable along the stroke S3 between the initial machine position X-Z and the end position OM.

A first rotary table 16 is rotably set on the second table 15 in such a way that the first rotary table 16 can be indexed in the rotation direction R about the rotation axis RO. The initial machine position X-Z can be set so as to coincide with the rotation axis RO.

The first rotary table 16 can be rotated for the indexing purpose at each one degree by means of a motor (not shown) equipped therein and an index mechanism (not shown).

The first rotary table 16 has an extension portion 17 extending upwardly. A second rotary table 19 is set onto a side portion 18 of the extension portion 17 in such a way that the second rotary table 19 can be indexed in the rotation direction Q about the rotation axis QO.

The second rotary table 19 can be rotated at each one degree for the index purpose by means of a motor 17a and an index mechanism (not shown) equipped therein.

The second rotary table 19 can be constructed of a collet chuck type or an electromagnet type. The second rotary table 19 has at its center a tapered opening 20 into which a workpiece holder 23 can be inserted as shown in FIGS. 4 and 5.

The second rotary table 19 holds the workpiece holder 23 by means of a collet chuck or an electromagnet chuck. The workpiece holder 23 can be easily removed from the second rotary table 19 if it is released.

The motors for the first and second tables 14, 15 are electrically connected to the NC machine 3. The moving distance and moving direction of the first and second tables 14, in the X and Z axes are controlled according to the programs of the NC machine 3. Also, the motors for the first and second rotary tables 16, 19 are electrically connected to the NC machine 3. The index angle and rotation direction of the first and second rotary tables 16, 19 are controlled according to the programs of the NC machine 3.

A motor (not shown) for actuating vertically the spindle 9 in the direction Y is electrically connected to the NC machine. The moving distance and moving direction of the spindle 9 in the direction Y are controlled according to the programs of the NC machine 3. The on-off timing of the second rotary table 19 is controlled according to the programs of the NC machine 3.

Referring back to FIGS. 1 and 2, the workpiece feeding means 4 includes a workpiece station 21 and an automatic workpiece changer 22. The workpiece feeding means 4 is used to load each of many workpieces W set in the workpiece station 21 onto the second rotary table 19 and, after machining thereof, unload each workpiece W from the second rotary table 19.

Figure 6:
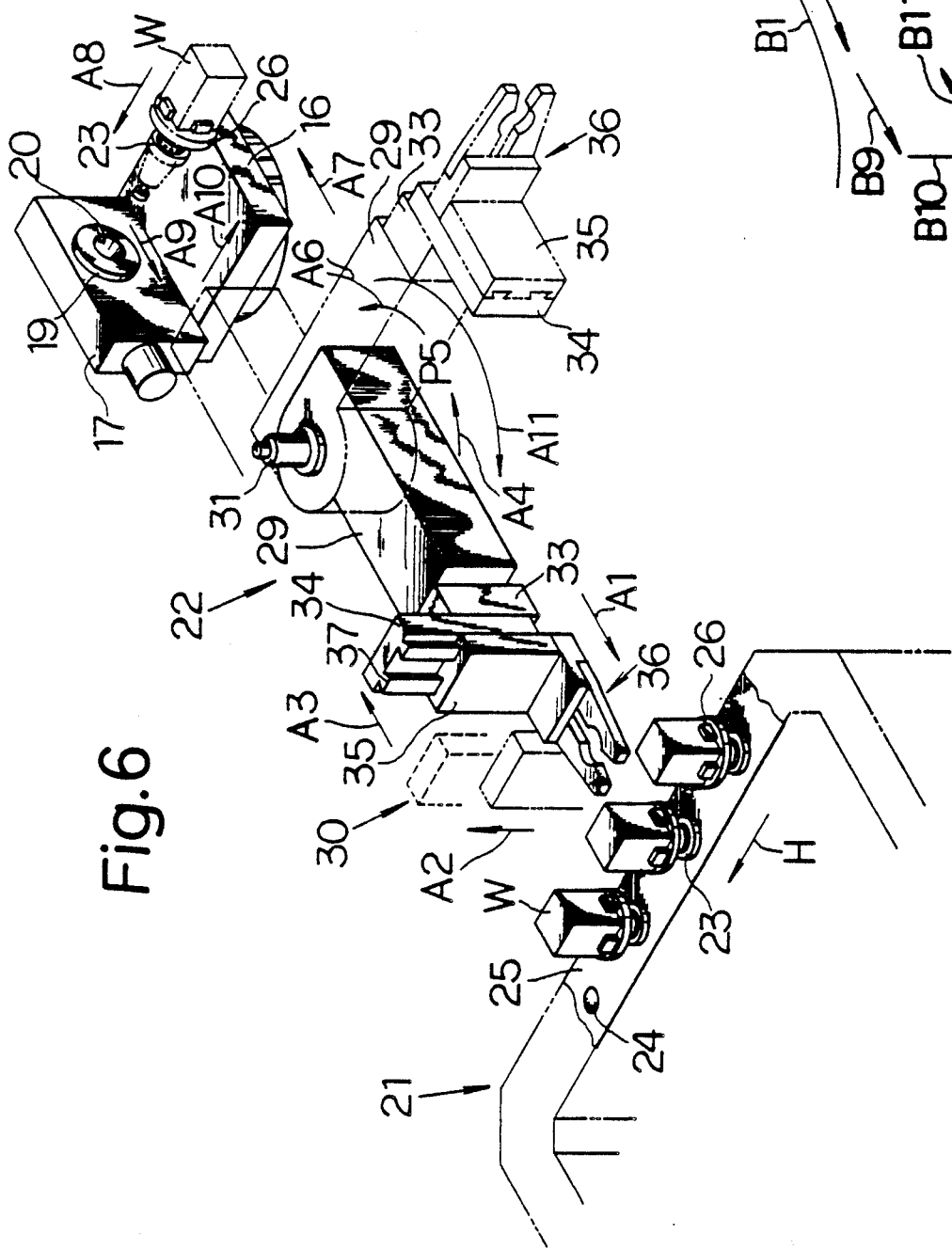
FIG. 6 is a perspective view showing a workpiece feeding means, a first rotary table and a second rotary table.
Figure 7:
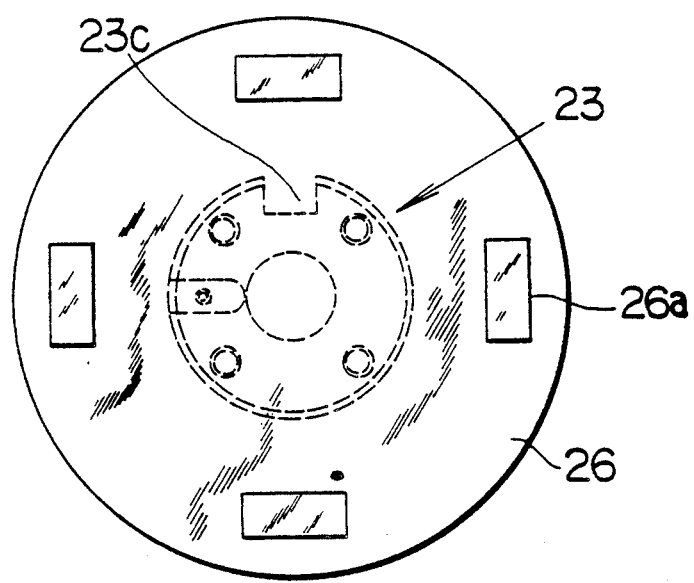
FIG. 7 is a plane view showing a workpiece holder and a disk.

An endless type conveyer 25 in the workpiece station 21 has a plurality of setting openings 24 shown in FIGS. 4 and 6. A metal disk 26 is fixed to an upper portion of the workpiece holder 23 as shown FIGS. 7 and 8.

Four workpiece fixing members 26a are fixed on the upper surface of the disk 26 at regular intervals. These workpiece fixing members 26a contact a first surface f1 through a fourth surface f4 of the workpiece W, respectively, with some friction so that the workpiece W can be attached to the disk 26.

A circular groove 27 is formed in an intermediate portion of the workpiece holder 23. A pull stud 28 is attached to a lower portion of the workpiece holder 23. The pull stud 28 is to be inserted into the opening 20 of the second rotary table 19 and the opening 24.

As shown in FIG. 2, a workpiece W is attached to each of plural disks 26 of the workpiece station 21. The conveyer 25 of the workpiece station 21 is actuated by an actuating means (not shown). Actuating timing of the conveyer 25 is controlled according to the programs of the NC machine 3. The motion of the automatic workpiece changer 22 is controlled according to the programs of the NC machine 3.

As shown in FIGS. 4 and 6, the automatic workpiece changer 22 includes a changer body 29 and an operation portion 30 attached thereto. The changer body 29 can be rotated about the vertical axis 31 by 180 degrees. If it turns by 180 degrees, a rod 32 moves back along the stroke J in FIG. 5.

The operation portion 30 can extend along the stroke S4 from the changer body 29 through plural rods 32 by means of an actuating means (not shown) equipped in the changer body 29, as shown in FIG. 4. A plate 33 of the operation portion 30 is fixed to each front end of the rods 32. An arm support 35 is attached by way of a support 34 to the plate 33.

An arm 36 is horizontally attached to a lower end of the arm support 35. An end portion of the arm 36 is formed so as to be set in the groove 27 of the workpiece holder 23. The arm support 35 can move vertically along the stroke S5 slidably on a rail 37 of the support 34 by way of an actuating means (not shown), as shown in FIG. 4.

As shown by dotted lines in FIG. 6, the support 34, the arm support 35 and the arm 36 can counterclockwisely rotate by 90 degrees with respect to the plate 33 by means of a rotation mechanism and an actuating means (not shown).

Figure 9:
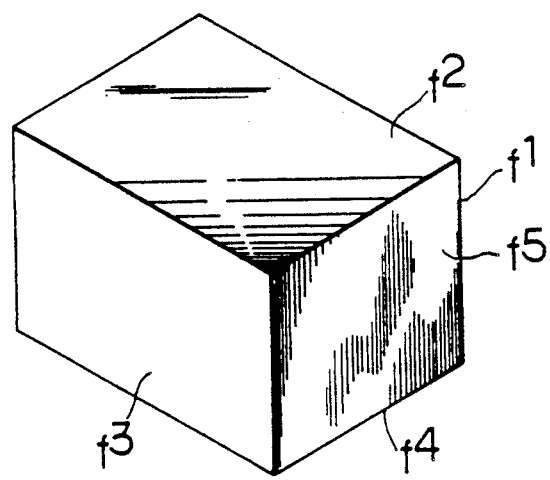
FIG. 9 is a perspective view showing one example of a workpiece.

Assuming that a workpiece W of a rectangular parallelepiped shape shown in FIG. 9 is to be machined, a fifth end surface F5 of the workpiece W is square. According to the programs of the NC machine 3, the first surface f1 through the fifth surface f5 of the workpiece W is drilled by the tool 11.

First, as shown in FIG. 5, the first table 14 moves from the initial machine position X-Z toward the tool 11 attached to the spindle 11 in the direction Z by a predetermined distance 1. Next, the second table 15 moves along the stroke S3 so as to come to the end position OM.

After that, the first rotary table 16 is clockwisely indexed by 90 degrees from the condition of FIG. 3 so that the rotation axis QO of the second rotary table 19 becomes parallel to the X axis.

Accordingly, the first and second rotary tables 16, 19 are set in a condition shown in FIGS. 4 and 5. This is an initial setting position.

The motion of the automatic workpiece changer 22 will be described, referring to FIGS. 4 through 6.

The rod 32 of the automatic workpiece changer 22 extends along the stroke S4 in the direction of the arrow A1 so that the arm 36 is set in the groove 7 of the workpiece holder 23 of the workpiece station 21. As the arm support 35 moves up along the stroke S5, the workpiece holder 23 is forcedly picked up from the opening 24 of the conveyer 25 in the direction of the arrow A2. While the arm 36 holds the workpiece holder 23 holding the workpiece W, the rod 32 contracts along the stroke S4 in the direction of the arrow A3.

Next, the changer body 29 rotates in the directions of the arrows A4, A6 by 180 degrees. During such rotation of the changer body 29, the support 34 and the arm support 35 rotate counterclockwisely by 90 degrees. They come to the position P5 shown by dotted lines in FIG. 6 although the workpiece W and the workpiece holder 32 are not shown for the purpose of simplifying the figure. As a result, the workpiece W is horizontally set.

When the changer body 29 is rotated in the direction of the arrow A6, the arm 36 and the workpiece holder 23 come near the second rotary table 19. The rod 32 again extends along the stroke S4 in the direction of the arrow A7. The workpiece holder 23 and the workpiece W held by the arm 36 are positioned in front of the second rotary table 20 as shown in FIGS. 4 and 5. The central axis of the workpiece holder 23 coincides with the center of the opening 20.

The arm support 35 moves along the stroke S5 in the direction A8 so that the pull stud 28 of the workpiece holder 23 is inserted into the opening 20. When the rod 32 contracts along the stroke S4, the arm 36 is removed from the workpiece holder 23 in the direction of the arrow A9. As a given attaching force of the second rotary table 19 is produced, the workpiece holder 23 is surely attached to the second rotary table 19. After the arm support 35 again moves along the stroke S5 in the direction of the arrow 10, the changer body 29 reversely rotates by 180 degrees in the direction of the arrow A11. Thus, the arm 36 is returned toward the workpiece station 21.

Referring again to FIGS. 4 and 5, the first table 14 moves toward the spindle 9, and the second table 15 moves forwardly from the end position OM in the direction X. The first surface f1 of the workpiece W faces the tool 11 (FIGS. 9 and 10).

At that time, the tool 11 is already set in such a position that the first surface f1 of the workpiece W can be machined.

Figure 10:
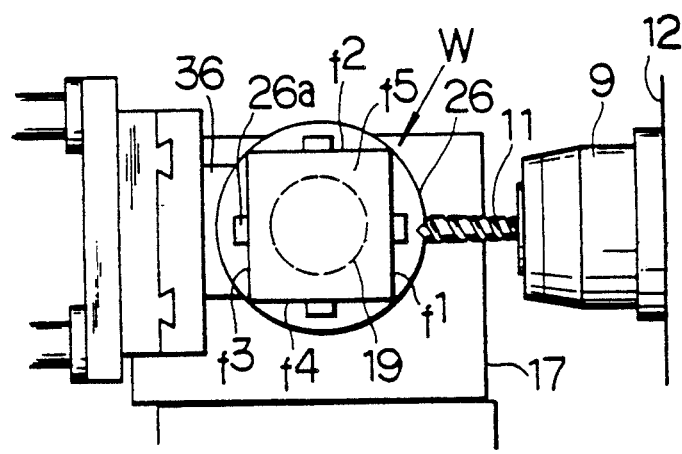
FIG. 10 is an explanatory view showing a condition in which a first surface of a workpiece is just to be machined.

Referring to FIGS. 3 and 10, the first table 14 further moves toward the tool 11 attached to the spindle so as to drill the first surface f1 by a predetermined depth. After that, the first table 14 moves back. After the second rotary table 19 is counterclockwisely indexed by 90 degrees, the second surface f2 is set in a precise position. The first table 14 again moves toward the tool 11, and the second surface f2 is machined by a predetermined depth. In a similar way, the third surface f3 and the fourth surface f4 are drilled.

When the first surface f1 through the fourth surface f4 have been completely machined, the first table 14 move back.

After that, the first rotary table 16 is indexed about the rotation axis RO by 90 degrees so that the fifth surface f5 of the workpiece W faces the tool 11 as shown in FIG. 3. The first table 14 again moves forward and drills the fifth surface f5 by a predetermined depth.

As can be seen from the foregoing, once the workpiece W is attached to the second rotary table 19, the first surface f1 through the fifth surface f5 of the workpiece W can be sequentially machined.

After the workpiece W is completely machined, the first and second tables 14 and 15 are returned to their initial setting positions (FIGS. 4 and 5).

Figure 11:
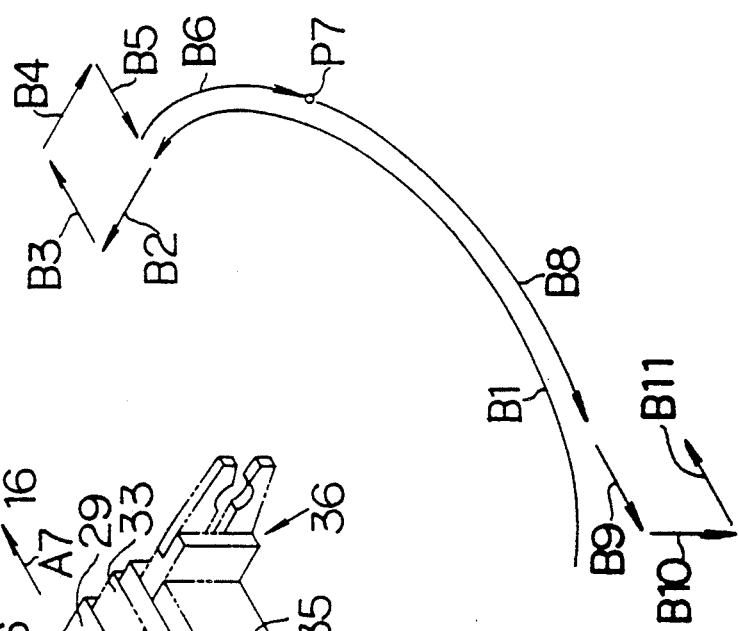
FIG. 11 is an explanatory view showing a condition in which a workpiece is unloaded from a second rotary table.

Referring to FIGS. 6 and 11, the steps of unloading the machined workpieces W to the workpiece station 21 will be explained.

The arm 36 is positioned near the workpiece station 21 after it is rotated by 180 degrees in the direction of the arrow A11. First, the changer body 29 is rotated counterclockwisely by 180 degrees in the direction of the arrow B1. Next, the arm support 35 moves along the stroke S5 toward the second rotary table 19 in the direction of the arrow B2. Further, the rod 32 extends in the direction of the arrow B3. The arm 36 is set in the groove 27 of the workpiece holder 23. In this condition, the holding force of the second rotary table 19 disappears. If the arm support 35 moves along the stroke S5 in the direction of the arrow B4, the workpiece holder 23 is released from the second rotary table 19 as shown in FIG. 5.

After that, the rod 32 contracts in the direction of the arrow B5, and then the changer body 29 is clockwisely rotated by 180 degrees in the directions of the arrows B6 and B8. During such rotation of the changer body 29, at the position P7, the support 34 and the arm support 35 are rotated clockwisely by 90 degrees with respect to the plate 34 so that the workpiece W is vertically set.

The rod 32 again extends in the direction of the arrow B9 in such a way that the workpiece holder 23 comes over a selected opening 24 of the conveyer 25.

When the arm support 35 moves down along the stroke S5 in the direction of the arrow B10, the pull stud 28 of the workpiece holder 23 is inserted into the opening 24. After that, the rod 32 contracts in the direction of the arrow B11 so as to remove the workpiece holder 23 from the arm 36.

Accordingly, the steps of loading, machining and unloading one workpiece W are completed.

A new workpiece W to be machined is set in such a position as to face the arm 36 by actuating the conveyer 25 in the direction of the arrow H in FIG. 6. Each workpiece W is first loaded onto the second rotary table 19 and after machining thereof unloaded from the second rotary table 19 and then returned to the workpiece station 21.

Figure 12:
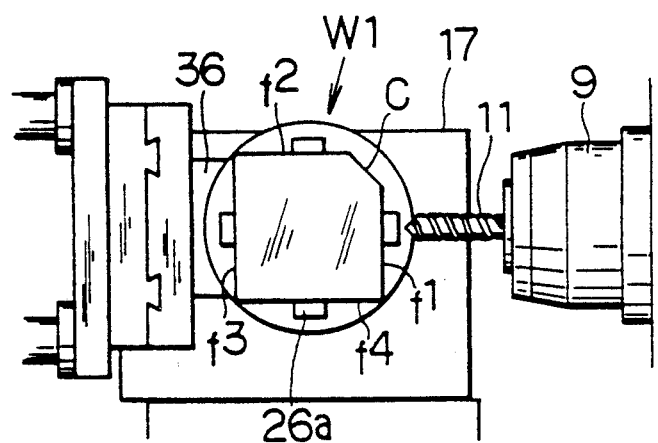
FIGS. 12 and 13 are explanatory views showing how a corner portion of a workpiece is machined.
Figure 13:
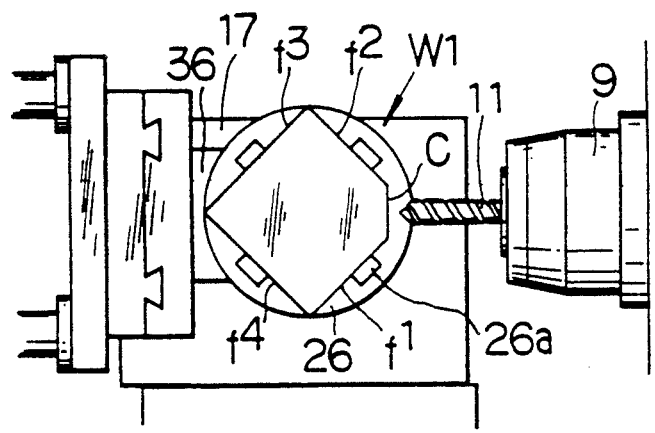

In some exceptional case, in addition to the first surface f1 through the fifth surface f5 of the workpiece W, a corner portion C of the workpiece W is machined. In such a case, as shown in FIG. 12, the second rotary table 19 is indexed such that the first surface f1 faces the tool 11. Next, the second rotary table 19 is clockwisely indexed by 45 degrees so that the corner portion C becomes to face the tool 11. After that, the workpiece W moves toward the tool 11 so as to drill the corner portion C.

Referring to FIGS. 14 to 22, a preferred mode of this invention will be explained in detail.

The conveyer in the workpiece station is formed of a chain type, for example, including many hollow pins in series. A pair of adjacent hollow pins 41, 42 are joined by two plates 45 at their end portion. Another pair of adjacent hollow pins 42, 43 are joined by two plates 46. A further pair of hollow pins 43, 44 are joined by two plates 47. In such a way, many hollow pins are joined in series so as to constitute a chain type of conveyer. Many main holders 40 are fixed in every two hollow pins 41, 43 by means of stop pins 41a, 43a.

Each main holder 40 has a setting opening 24 into which the workpiece holder 23 can be inserted and positioned. Spring means 48 set at the opening 24 has plural balls 48b and plural springs 48a extending radially for pressing the balls 48b against the pull stud 28 of the workpiece holder 23 when the workpiece holder 23 is inserted into the opening 24.

The holder 40 has a tapered portion 40a corresponding to the tapered surface 23a of the workpiece holder 23.

The workpiece holder 23 is inserted into the setting opening 24 in such a way that a large diameter portion 28a of the pull stud 28 moves through a small diameter opening 40b of the holder 40 whereby the spring means 48 presses a shaft portion 28b of the pull stud 28 thereby to hold the workpiece holder 23 in position.

In the shown embodiment, forty holders 40 can be set in every two hollow pins 41, 43.

A pair of grooves 23b, 23c are formed in the workpiece holder 23 at the opposite positions. A stop 40c fixed to the plate 43 can be set in the groove 23c so that the stop 40c can prevent the workpiece holder 23 from rotating in the holder 40.

Referring to FIGS. 2 and 18, the conveyer 25 is guided and actuated by a plurality of sprockets (not shown) at plural corner portions WC1 through WC5. These sprockets are attached to a setting member 49 in the workpiece station 21. The conveyer 25 has a transfer path WL along which the workpiece holders 23 move. The transfer path WL includes a first path portion WL1 which is straight in front of the automatic workpiece changer 22. A second and fourth path portions WL2, WL4 are also straight next to the first path portion WL1. The transfer path WL has also two corner portions WC1, WC2 each of which is an arc of a circle. A third path portion WL3 has a concave portion formed in a V-shape or U-shape so as to extend slightly over the center CP of the workpiece station 21. The third path portion WL3 has three corner portions WC3, WC4, WC5 each of which is an arc of a circle.

As the transfer path WL of the conveyer 25 has the above stated shape or form, the length of the transfer path WL can be remarkably enlarged within the limited space on the workpiece station 21. Therefore, many workpiece holders 23 and many works W can be set on the conveyer 25. If the setting member 49 has a concave portion formed in a V-shape or U-shape so as to extend slightly over the center CP of the workpiece station 21. The third path portion WL3 has three corner portions WC3, WC4, WC5 each of which is an arc of a circle.

As the transfer path WL of the conveyer 25 has the above stated shape or form, the length of the transfer path WL can be remarkably enlarged within a limited space on the workpiece station 21. Therefore, many workpiece holders 23 and many workpieces W can be set on the conveyer 25. If the setting member 49 has a concave portion of a shape corresponding to that of the transfer path WL, an operator can stand in the concave portion near the corner portion WC5 of the third path portion WL3 where he can make effectively exchange of the workpiece holders 23 and the workpieces W regardless of any running or stopping condition of the conveyer 25. Also, he can make exchange of them at the first, second and fourth path portions WL1, WL2, WL4 and the two corner portions WC1, WC2.

For instance, exchange of the workpieces W and the workpiece holders 23 should be made if a wrong workpiece W is set in the workpiece holder 23. The operator pulls up the wrong workpiece holder 23 against the biasing force of the spring means 48 so that it can be pulled out from the holder 40. After that, the operator inserts a desired workpiece holder 23 into the opening 24.

Referring to FIGS. 8, 16, 17 and 18, an elongate groove 50 is formed in an underside portion 26a of the disk 26. Five detected elements or dogs D1 through D5 are provided in the elongate groove 50 by means of screws 51 through 55. These detected elements or dogs D1 through D5 are detachably arranged in series in the direction of the arrow H, that is, the transfer direction of the conveyer 25. The detected elements D1 through D5 are positioned at the predetermined points P1 through P5 in the elongate groove 50 so as to identify a type of a selected workpiece W set on the specific workpiece holder 26.

The workpiece station 21 has a detection portion 56 as shown in FIGS. 16 and 18. The detection portion 56 is positioned so as to correspond to the automatic workpiece changer 22. As best shown in FIG. 16, the detection portion 56 is attached to an under side portion 49a of the setting member 49 in the workpiece station 21. The detection portion 56 has five contact switches such as limit switches LS1 through LS5. The detection portion 56 is used to detect presence or absence of the detected elements D1 through D5 at the points P1 through P5 of the workpiece holder 23 when the workpiece holder 23 comes to a predetermined position facing the arm 36 of the automatic workpiece changer 22.

Table 1 shows as an example a set of various type workpieces each having a specific workpiece number such as No.1 through No.31. For example, in case workpiece No. 1 is set in the workpiece holder 23, only the detected element D1 is set in the elongate groove 50. In this case, only the limit switch LS1 is to contact the detected element D1 thereby to produce an ON signal as shown by a circle in Table 1. The other limit switches LS2 through LS5 are off thereby to produce OFF signals. Workpieces Nos. 2 through 31 are also controlled in the same way.

As shown in FIG. 16, ON and/or OFF signals in combination of the limit switches LS1 through LS5 are sent to a decision unit 57 for deciding what type of workpiece W is set in the detected workpiece holder 23 on the basis of various combined signals. A decision signal for a specific type of workpiece W is sent to the NC machine 3 so that desired machining programs for the detected workpiece is called in the NC Machine. According to such machining programs, the workpiece W is machined at the machine tool body 1 in the above-stated manner.

FIGS. 19 through 22 show a workpiece holder supporting means 71. The arm support 35 has the arm 36 equipped with a horizontal plate 72, bolts 72, 76 and a stop 79. A first finger 73 and a second finger 74 are rotatably attached to a lower portion of the horizontal plate 72 by way of the bolts 75, 76. The first and second fingers 73, 74 are symmetrical. The bolts 75, 76 penetrate through a central portion of the first and second fingers 73, 74. A claw 77 is formed on an inner portion of the first finger 73, and a claw 78 is formed on an inner portion of the second finger 74. These claws 77, 78 face to each other and are formed in a shape corresponding to that of the groove 27 of the workpiece holder 23 so that the workpiece 23 can be caught by them.

Figure 8:
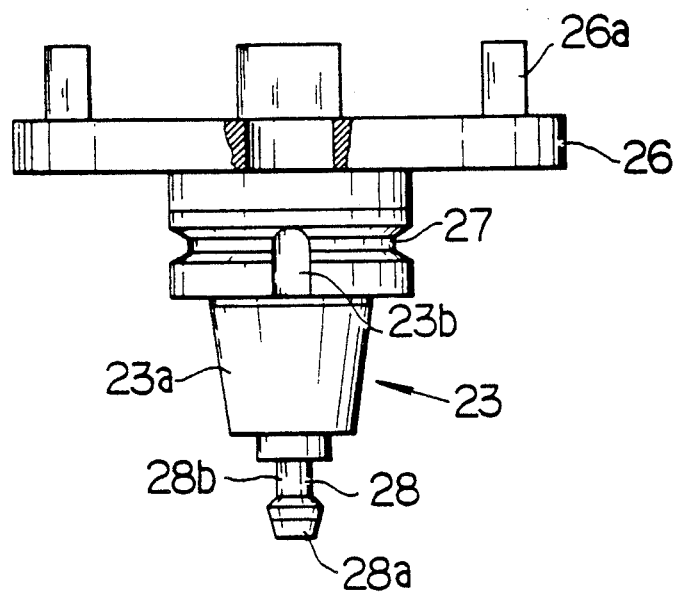
FIG. 8 is a front view showing, with some portion thereof being broken out, a workpiece holder and a disk.

A stop 79 and a spring 80 are attached between the first and second fingers 73, 74. The stop 79 is attached to a lower surface of the horizontal plate 72. When the workpiece holder 23 is caught by the claws 77, 78, the stop 79 is inserted into the groove 23b of the workpiece holder 23 as shown in FIGS. 8 and 19, thereby to prevent the workpiece holder 23 from rotating in respect to the first and second fingers 23, 74.

Figure 21:
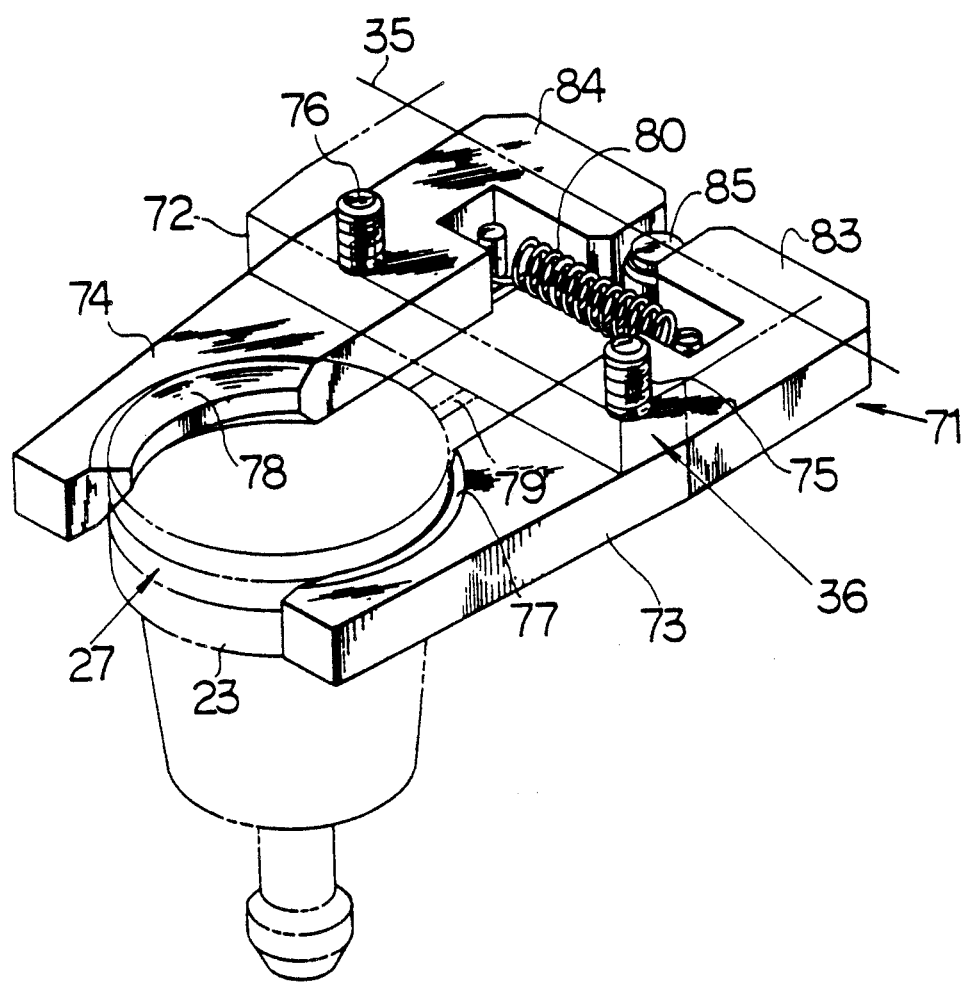
FIG. 21 is a perspective view of the arm and the fingers for holding the workpiece holder shown in FIG. 20.

The spring 80 is set between the bolt 81 of the first finger 73 and the bolt 82 of the second finger 74. The bolt 81 is positioned between a rear portion 83 of the first finger and the bolt 75. The bolt 82 is positioned between a rear portion 84 of the second finger 74 and the bolt 76. These rear portions 83, 84 are formed of a L-shape. A lock pin 85 can be inserted between the rear portions 83, 84 against the spring force of the spring 80. The lock pin 85 is fixed to one end of the joint plate 86 as shown in FIG. 19. The other end of the joint plate 86 is joined to a rod 88 of an air cylinder means 87 functioning as an operation means. The air cylinder means 87 is fixed to the arm support 35 by means of the bolts 89, 90. The rod 88 can move vertically along the stroke SY. When an air or oil feeding apparatus (not shown) operates, the rod 88 contracts, and the lock pin 85 is inserted between the rear portions 83, 84 as shown in FIGS. 19, 20 and 21, so that the workpiece holder 23 can be held by the claws 77, 78. If the rod 88 extends along the stroke SY, as shown in FIG. 22, the lock pin 85 comes back downwardly from between the rear portions 83 and 84 whereby the claws 77, 78 are opened by the spring force of the spring 80 thereby to release the workpiece holder 23 from the workpiece holder 23.

The arm support 35 can move vertically along the stroke S5 on the rail 37 of the support 34 in response to the action of the air cylinder means 70 as shown in FIGS. 4 and 19.

The support 34, the arm support 35 and the arm 36 are counterclockwisely rotatable within a range of 90 degree in respect to the plate 33 by means of an actuation means and a rotating mechanism (not shown), as shown by dotted lines in FIG. 6.

Assuming that the workpiece W shown in FIG. 9 is to be machined, for example, the first through fifth surfaces F1–F5 thereof are to be drilled by the tool 11, the workpiece holder 23 and the workpiece W set therein are set to face the arm 36 of the automatic workpiece changer 22. In case this workpiece is workpiece No.10 shown in Table 1, the detected elements D2, D4 are set on the disk 26 of the workpiece holder 23. When the workpiece holder 23 come to a predetermined position, the limit switches LS2, LS4 of the detection portion 56 contact the detected elements D2, D4, respectively, whereby ON signals of the limit switches LS2, LS4 and OFF signals of the other limit switches LS1, LS3, LS5 are sent to the detection unit 57. Upon receipt of such signals in combination, the decision unit 57 decides a specific type of the workpiece W and then produces a decision signal corresponding to work No. 10. This decision signal is sent to the NC machine 3 so that the desired machining programs for the specific type (work No. 10) of the workpiece W is called.

Referring to FIGS. 19 and 22, the operation of the automatic workpiece changer 22 will be briefly stated. Assuming that the rod 88 of the air cylinder means 87 extends, the first and second fingers 73, 74 are relatively open as shown in FIG. 22 so that the claws 77, 78 are positioned at the opposite sides of the groove 27 in the workpiece holder 23. The stop 79 is set in the groove 23b of the workpiece holder 23. Next, when the air cylinder means 87 contracts, the lock pin 85 is inserted between the two rear portions 83, 84. Thus, the claws 77, 78 forcedly contact the groove 27 whereby the fingers 73, 74 can hold the workpiece holder 23.

Referring to FIGS. 18 through 22, when the pull stud 28 of the workpiece holder 23 is inserted into the opening 20, the rod 88 of the air cylinder means 87 extends, the lock pin 85 moves back from between the two rear portions 83, 84. As a result, the claws 77, 78 become open due to the spring force of the spring 80. The rod 32 contracts along the stroke S4 so that the workpiece holder 23 can be released from the fingers 73, 74 in the direction of the arrow A9.

The workpiece holder 23 is attached to the second rotary table 19. The arm support 35 again moves along the strokes S5 in the direction of the arrow A10. Thereafter the arm 29 rotates by 180 degree in the direction of the arrow A11. Thus the arm 36 moves back to its original position.

When the arm support 35 moves along the stroke S5 in the direction of the arrow B2 and then the rod 32 extends in the direction of the arrow B3, the claws 77, 78 are positioned at the opposite positions of the groove 27 of the workpiece holder 23. The stop 79 is set in the groove 23b. The air cylinder means 87 contracts, and the lock pin 85 is inserted between the rear portions 83, 84. Thus the claws 77, 78 can hold the workpiece holder 23 between them.

This invention is not limited to the above-stated embodiments. For instance, a longitudinal direction of the bed can be set at a right angle to the central axis of the spindle. The disk 26 can be made of a permanent magnet type. Any number of detected elements can be used on the disk. Also, the number of switches in the detection portion is not limited to the above-stated embodiment. The limit switches are not limited to a contact type switch. For example, non-contact type switches can be used.

What is claimed is:

1. A machine tool, comprising:
    a machine tool body;
    a spindle provided at the machine tool body for holding a tool, the spindle being movable in a vertical direction;
    a bed provided in the machine tool body;
    a plurality of workpiece holders each holding one workpiece, each of the workpiece holders having first and second recesses;
    movable table means provided on the bed for holding detachably a workpiece holder and moving the workpiece holder to a predetermined position near the tool so that the workpiece can be machined by the tool;
    a workpiece station for storing many workpiece holders;
    a workpiece changer for changing selectively the workpiece holders between the table means and the workpiece station;
    the workpiece station including an endless type transfer means having a series of setting openings;
    a pair of first and second fingers provided in said workpiece changer for holding at least one of said workpieces;
    first stop means disposed on said transfer means for preventing the workpiece holder from rotating in the setting opening when the first stop means engages the first recess of the workpiece holder; and
    second stop means disposed on said workpiece changer for preventing the workpiece holder from rotating with respect to the first and second fingers when the second stop means engages the second recess of the workpiece holder.

2. The machine tool of claim 1, wherein the first and second recesses are grooves.

3. The machine tool of claim 2, wherein said first and second grooves are located at opposing positions.

4. The machine tool of claim 2, wherein each of said workpiece holders has on its outer surface a third circular groove around its axis for engaging said first and second fingers, and wherein said first and second grooves cross said third groove.

5. The machine tool of claim 2, wherein a plurality of main holders are set in plural hollow pins arranged as said endless type transfer means for providing said setting openings therein, and wherein said first stop means are fixed relative to said hollow pins.

6. The machine tool of claim 5, wherein said main holders are set in only selected ones of said hollow pins.

7. The machine tool of claim 5, wherein said hollow pins are joined by plural plates so as to constitute a chain type conveyor, and wherein said first stop means are fixed to said plates.

8. The machine tool of claim 2, wherein said workpiece changer includes a workpiece holder supporting means, and wherein said second stop means is fixed to said workpiece holder supporting means.

9. The machine tool of claim 8, wherein said workpiece holder supporting means includes a plate to which said first and second fingers are attached, and wherein said second stop means is fixed to said plate.

* * * * *